United States Patent
Sakamoto et al.

(10) Patent No.: US 7,333,740 B2
(45) Date of Patent: Feb. 19, 2008

(54) IMAGE-FORMATION CONTROL APPARATUS, METHOD FOR CALIBRATING IMAGE FORMING APPARATUS, AND PROGRAM

(75) Inventors: Masaomi Sakamoto, Kanagawa (JP); Masao Seki, Kanagawa (JP); Ryuichi Ishizuka, Kanagawa (JP); Yukiharu Inoue, Kanagawa (JP); Toshifumi Takahira, Kanagawa (JP); Ryo Agehama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 223 days.

(21) Appl. No.: 11/258,320

(22) Filed: Oct. 26, 2005

(65) Prior Publication Data
US 2006/0285862 A1    Dec. 21, 2006

(30) Foreign Application Priority Data
Jun. 15, 2005    (JP)    ............................. 2005-175450

(51) Int. Cl.
G03G 15/00    (2006.01)

(52) U.S. Cl. .............................. 399/49; 399/15; 399/72

(58) Field of Classification Search .................. 399/15, 399/49, 72, 27, 28; 347/19; 358/1.15, 1.9, 358/504, 406; 430/120.1
See application file for complete search history.

(56) References Cited

U.S. PATENT DOCUMENTS 5,576,811 A * 11/1996 Kobayashi et al. ....... 399/15 X
5,887,223 A * 3/1999 Sakai et al. ............... 399/15 X
6,687,471 B2 * 2/2004 Sakata et al. ................. 399/49
7,054,568 B2 * 5/2006 Mizes et al. .................. 399/49
2002/0181018 A1    12/2002 Hung ........................ 358/1.15

FOREIGN PATENT DOCUMENTS

| JP | 2002-196551 A | * | 7/2002 |
| JP | 2003-150006 A | * | 5/2003 |
| JP | 2004-070115 A | * | 3/2004 |

* cited by examiner

Primary Examiner—Sophia S. Chen
(74) Attorney, Agent, or Firm—Oliff & Berridge, PLC

(57) ABSTRACT

An image-formation control apparatus is connected to an image forming apparatus for forming an image on a medium with a plurality of color materials. The image-formation control apparatus includes a receiving unit and a first calibration unit. The receiving unit receives an image formation command, which is to be executed by the image forming apparatus. The first calibration unit generates a first formation command to form a first number of color patches for adjusting output characteristics of the color materials in the image forming apparatus and outputs the generated first formation command to the image forming apparatus. The first calibration unit calculates an estimated consumption amount of each color material used in the image forming apparatus on a basis of the received image formation command and determines colors of the color patches formed on a patch sheet on a basis of the estimated consumption amount.

4 Claims, 3 Drawing Sheets

IMAGE-FORMATION CONTROL APPARATUS, METHOD FOR CALIBRATING IMAGE FORMING APPARATUS, AND PROGRAM

BACKGROUND

1. Technical Field

The invention relates to an image-formation control apparatus, which is connected to an image forming apparatus, such as a printer, to control the image forming apparatus.

2. Related Art

A device for forming an image with a plurality of color materials, such as a color printer, adjusts the amount of color materials used in order to reproduce a predetermined color specified by an image formation command and performs a calibrating process for setting the reproducibility of colors to a predetermined state.

However, there is a limitation in improving the accuracy of correction because the consumption of each color material is not considered in an image forming process.

Accordingly, the invention provides an image-formation control apparatus capable of improving the accuracy of calibration.

SUMMARY

According to one embodiment of the invention, an image-formation control apparatus is connected to an image forming apparatus for forming an image on a medium with a plurality of color materials. The image-formation control apparatus includes a receiving unit and a first calibration unit. The receiving unit receives an image formation command, which is to be executed by the image forming apparatus. The first calibration unit generates a first formation command to form a first number of color patches for adjusting output characteristics of the color materials in the image forming apparatus and outputs the generated first formation command to the image forming apparatus. The first calibration unit calculates an estimated consumption amount of each color material used in the image forming apparatus on a basis of the received image formation command and determines colors of the color patches formed on a patch sheet on a basis of the estimated consumption amount.

According to one embodiment of the invention, a method for controlling image formation includes receiving an image formation command, which is to be executed by an image forming apparatus for forming an image on a medium; generating a first formation command to form a first number of color patches for adjusting output characteristics of the color materials in the image forming apparatus; outputting the generated first formation command to the image forming apparatus; calculating an estimated consumption amount of each color material used in the image forming apparatus on a basis of the received image formation command; and determining colors of the color patches formed on a patch sheet on a basis of the estimated consumption amount.

According to one embodiment of the invention, a program stored in a recording medium causes a computer to perform a process including receiving an image formation command, which is to be executed by an image forming apparatus for forming an image on a medium; generating a first formation command to form a first number of color patches for adjusting output characteristics of the color materials in the image forming apparatus; outputting the generated first formation command to the image forming apparatus; calculating an estimated consumption amount of each color material used in the image forming apparatus on a basis of the received image formation command; and determining colors of the color patches formed on a patch sheet on a basis of the estimated consumption amount.

According to these configurations, the accuracy of calibration can be improved by performing auxiliary calibration in addition to normal calibration on an image forming apparatus, on the basis of the estimated consumption amount of color materials used for forming images.

DETAILED DESCRIPTION

Figure 1:
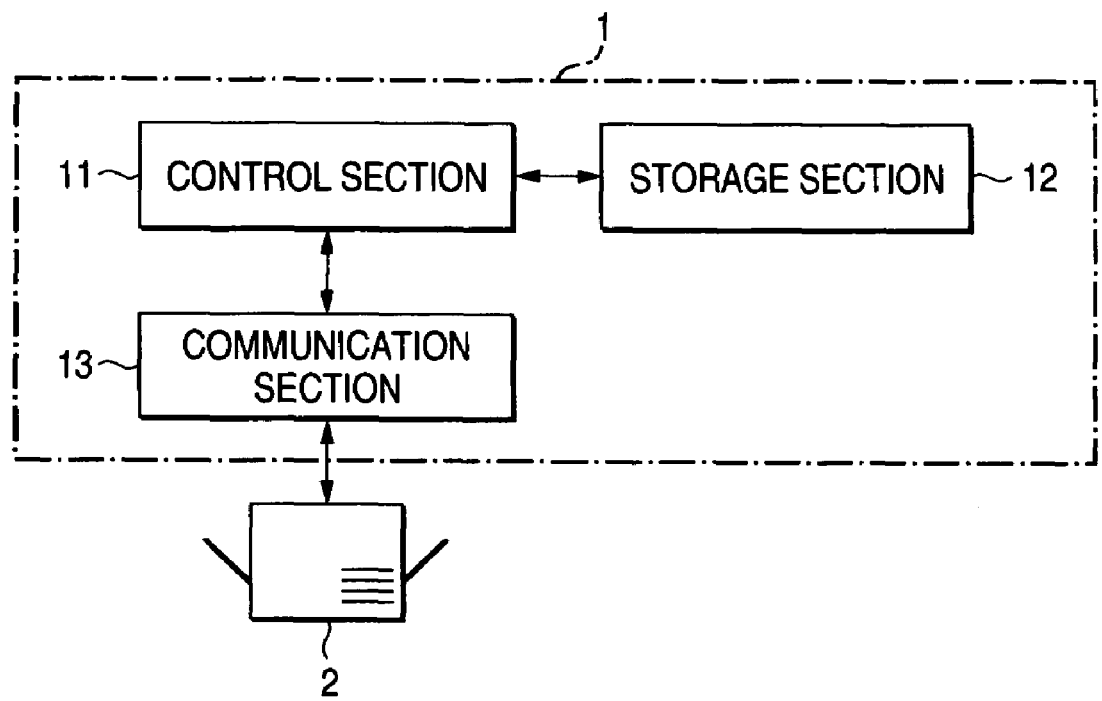
FIG. 1 is a block diagram illustrating the construction and connection of an image-formation control apparatus according to an embodiment of the invention.

Hereinafter, embodiments of the invention will be described in detail with reference to the accompanying drawings. As shown in FIG. 1, an image-formation control apparatus according to this embodiment is implemented by a printer server 1, and is connected to a printer 2 serving as an image forming apparatus.

As shown FIG. 1, the printer server 1 serving as the image-formation control apparatus according to this embodiment, includes a control section 11, a storage section 12, and a communication section 13.

The control section 11 may be implemented by a CPU, and operates according to a program stored in the storage section 12. In this embodiment, the control section 11 performs a process, which includes receiving an image formation command (a print job) from a client through the network and storing the received image formation command in the storage section 12; and a process, which includes generating a command, which causes the printer 2 serving as the image forming apparatus to form a color patch for calibration. The operation of the control section 11 will be described later in detail.

The storage section 12 includes a storage device, such as a RAM (Random Access Memory) or a ROM (Read Only Memory), and a disk device, such as a hard disk. The storage section 12 stores the program executed by the control section 11. The storage section 12 also operates as work memory of the control section 11. In this embodiment, the storage section 12 stores print jobs.

The communication section 13 is a network interface, and transmits data to a predetermined address, such as the printer 2, according to a command input from the control section 11. The communication section 13 also receives data from clients or the like and outputs the received data to the control section 11.

The printer 2 prints images on a predetermined medium, such as a paper, according to the image formation command (print job) received from the printer server 1 through the network. The printer 2 according to this embodiment forms color images using a plurality of color materials (for example, toner).

Processes performed by the control section 11 of the printer server 1 will be described below in below. The control section 11 of this embodiment receives the image formation command (the print job) from the client through the network and stores the received image formation command in the storage section 12.

If the control section 11 of this embodiment receives the image formation command through the network, the control section 11 issues a unique identifier. The control section 11 sequentially stores the received image formation commands in the storage section 12 while associating the received image formation commands with the issued unique identifier and generates queue. The control section 11 outputs the image formation commands to the printer 2 in an order stored in the queue. At this time, the control section 11 counts the number of sheets to be printed by each image formation command as a sheet counting value.

The control section 11 generates a command, which causes the printer 2 to form a color patch for calibration. In this embodiment, the control section 11 generates a first patch-sheet generating command including a plurality of color patches, for adjusting output characteristics of each toner in the printer 2, and then outputs the first patch-sheet generating command to the printer 2 (normal calibration process). In addition, at a predetermined timing, the control section 11 generates a second patch-sheet generating command including a command to form color patches number of which is smaller than that of the color patches included in the first patch sheet, and then outputs the second patch-sheet generating command to the printer 2 (auxiliary calibration process).

In general, the detailed explanation of the normal calibration process is omitted because the normal calibration process is similar to a general calibration process. Hereinafter, executing timing of the auxiliary calibration process and a method of determining colors of the second color patch in the auxiliary calibration process will be described.

That is, in this embodiment, the control section 11 previously receives a command to set an execution interval of the auxiliary calibration process from an administrator, and then stores the received command in the storage section 12. The administrator may designate the execution interval by number of printed sheets, e.g., 'every N pages'.

The image formation command output to the printer 2 includes information as to whether or not the color patch of the auxiliary calibration process should be formed and information as to whether or not the auxiliary calibration should be executed in advance. That is, a user who instructs the printer 2 to perform printing sets through a client device the information as to whether or not the color patch of the auxiliary calibration process should be formed and the information as to whether the auxiliary calibration should be executed in advance.

Figure 2:
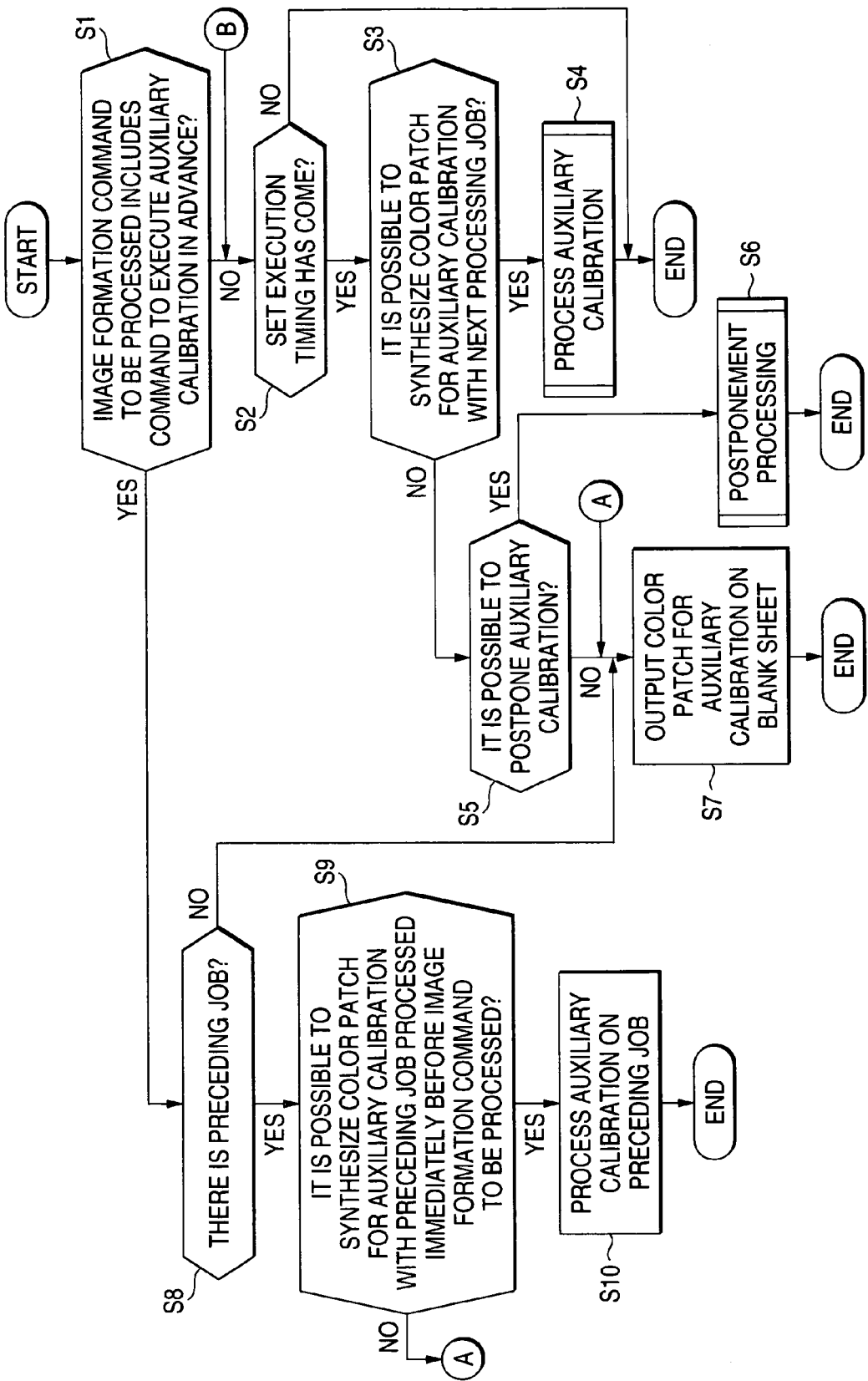
FIG. 2 is a flowchart showing the operation of the image-formation control apparatus according to the embodiment of the invention.

For example, whenever receiving the image formation command, the control section 11 performs the process shown in FIG. 2. First, the control section 11 checks whether or not the image formation command to be processed includes the information indicating that the auxiliary calibration should be executed before processing the received image formation command (S1). If the information is not included in the image formation command (No), the control section 11 checks whether or not a total number of sheets, which have been printed by image formation command output to the printer 2 after the previous auxiliary calibration, exceeds the set execution interval (that is, checks whether or not the predetermined execution timing has come; S2). In other words, the control section 11 stores the number of sheets, which have been printed up to that time, whenever forming the color patch for the auxiliary calibration. The control section 11 compares the stored number of printed sheets and the current number of printed sheets to determine whether or not the set execution interval is exceeded.

Figure 3:
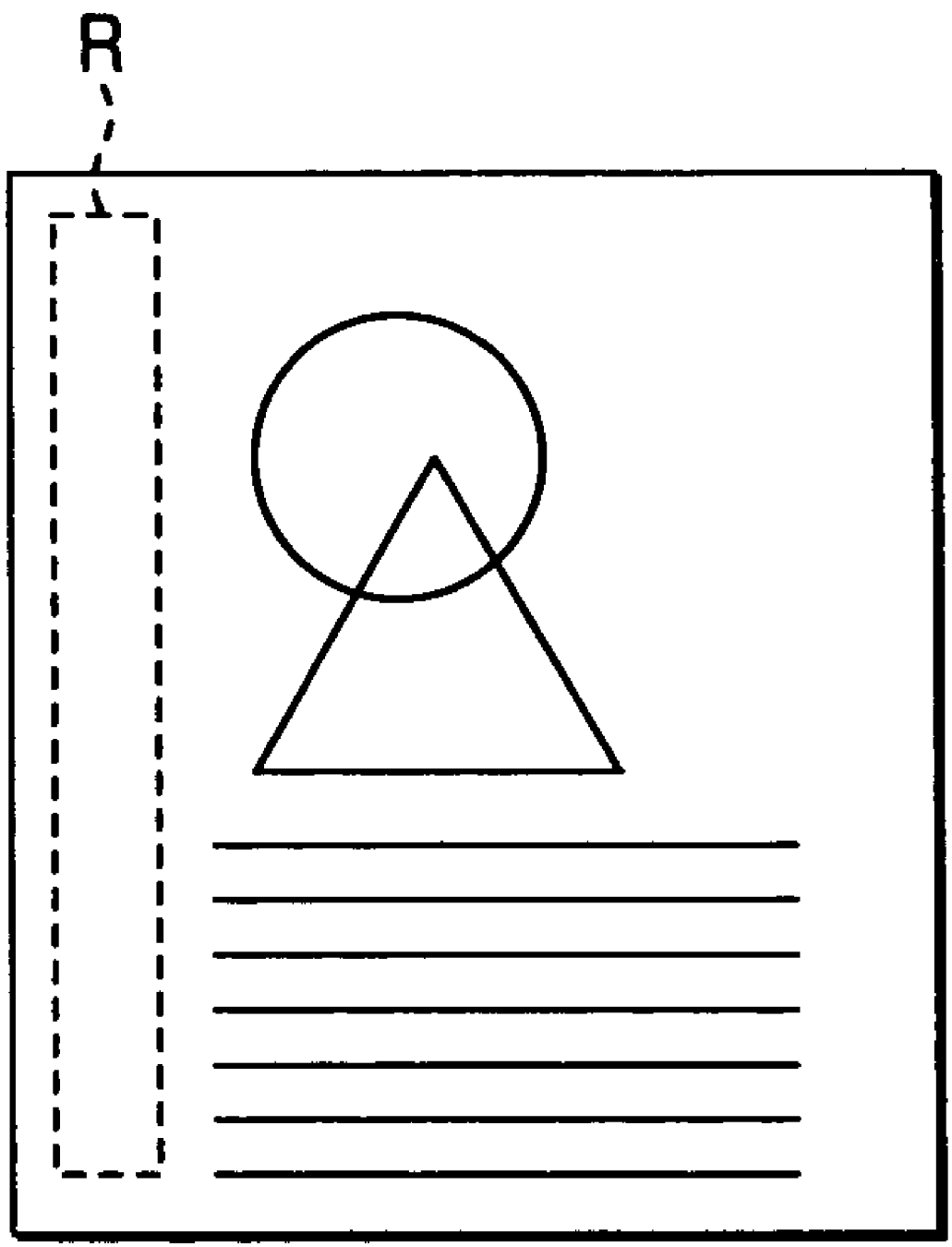
FIG. 3 is a diagram showing an example of a forming area of a color patch of auxiliary calibration set in the image-formation control apparatus according to the embodiment of the invention.

If the set execution interval is exceeded (yes), the control section 11 acquires the next image formation command (hereinafter, referred to as 'the next process job' to distinguish from the image formation command, which is a process target) to be output to the printer 2 by referring to the queue stored in the storage section 12. Then, the control section 11 determines whether or not it is possible to synthesize the color patch for the auxiliary calibration in a part of the received next process job (S3). The control section 11 makes this determination by checking whether or not the next process job includes information indicating to allow that the color patch of the auxiliary calibration process is formed and whether or not an image based on the next process job has a region where the color patch can be synthesized. Accordingly, when an image is drawn in a region (R), which is determined in advance as a region where a color patch should be synthesized (such as an edge portion of a sheet of paper shown in FIG. 3), the control section 11 performs control so that the auxiliary calibration process is not performed.

When the control section 11 determines at S3 that it is possible to form the color patch of the auxiliary calibration process (Yes), the control section 11 performs the auxiliary calibration process (S4) and terminates the process. On the contrary, when the control section 11 determines at S3 that it is not possible to form the color patch of the auxiliary calibration process (No), the control section 11 checks whether or not the auxiliary calibration process can be postponed (S5).

For example, when postponing the auxiliary calibration process, the control section 11 checks whether or not a storage area for a postponement counter is secured in the storage section 12. If the storage area is not secured, the control section 11 resets the postponement counter to '0'. When the postponement counter has been set, the control section 11 also adds the number of sheets to be formed by the image formation command to the counter whenever the image formation command is output to the printer 2 (postponement process; S6). When the value of the postponement counter exceeds a predetermined threshold value, the control section 11 determines at S5 that it is impossible to postpone the auxiliary calibration process.

When the control section 11 determines at S5 that it is impossible to postpone the auxiliary calibration process (No), the control section 11 outputs to the printer 2 an image formation command to form a color patch for the auxiliary calibration independently of the received image formation command (S7), and terminates the process. In this case, the printer 2 forms and outputs the color patch for the auxiliary calibration on a blank sheet of paper.

Meanwhile, if the total number of sheets, which have been printed by the image formation command output to the printer 2 after the previous auxiliary calibration, does not exceed the predetermined execution interval (No) at S2, the process is terminated.

When the image formation command to be processed includes information indicating that the auxiliary calibration process should be performed in advance (Yes at S1), the control section 11 checks whether or not an image formation command (hereinafter, referred to as 'a preceding job') to be output to the printer 2 before the image formation command to be processed exists, with reference to the queue (S8). If the preceding job does not exist (No at S8), the process proceeds to step S7 to output to the printer 2 the image formation command to form the color patch of the auxiliary calibration, and then the process is terminated.

If the preceding job exists (Yes at S8), the control section 11 determines whether or not it is possible to synthesize the color patch for the auxiliary calibration in an image formed by the preceding job to be output to the printer 2 immediately before the image formation command to be processed among preceding jobs (S9). In a similar manner to S3, the control section 11 makes this determination by checking whether or not the next process job includes information indicating to allow that the color patch of the auxiliary calibration process is formed and whether or not an image based on the next process job has a region where the color patch can be synthesized.

When it is possible to synthesize the color patch for the auxiliary calibration in the image formed by the preceding job to be output to the printer 2 immediately before the image formation command to be processed (Yes at S9), the control section 11 performs the auxiliary calibration process on the preceding job (S10), and terminates the process. Also, when it is impossible to synthesize the color patch for the auxiliary calibration in the image formed by the preceding job to be output to the printer 2 immediately before the image formation command to be processed (No at S9), the process returns to step S7 (A) to output to the printer 2 the image formation command to form the color patch of the auxiliary calibration, and then the process is terminated.

When the image formation command is output to the printer 2 (B), the control section 11 of this embodiment performs steps following step S2 shown in FIG. 2. Accordingly, it is possible to perform the delayed auxiliary calibration process appropriately.

Next, contents of the auxiliary calibration processes in steps S4, S7, and S10 will be described. In these auxiliary calibration processes, first, the control section 11 calculates an estimated consumption of each toner on the basis of each image formation command stored in the queue, and determines a color of each color patch for the auxiliary calibration on the basis of the estimated consumption.

More specifically, when receiving an image formation command, the control section 11 calculates estimated consumptions of toners involved in the received image formation command. This calculation is performed as follow, for example. The control section 11 performs a rasterizing process on the basis of the image formation command from which an estimated consumption is to be calculated. Then, a bitmap image is formed for every color material in the printer 2 (color separation process). For example, if the color materials on the printer 2 include cyan (C), magenta (M), yellow (Y), and black (K), the control section 11 generates bitmap data for each color.

Preliminarily, toner consumption amount per pixel (unit consumption amount) at predetermined density 'de' (hereinafter, called unit density) is referred to as 'te' and stored in the storage section 12. For an i-th pixel on the bitmap data having a given color among the colors, an estimated value tp of the toner consumption amount for every pixel is calculated by the following expression with using a pixel density 'di'.

$$tpi = di \times te/de$$

Then, a total sum of the estimated values tp of the toner consumption amount per pixel in bitmap data of the given color is calculated by the following expression.

$$Tc = \Sigma tpi = te/de \times \Sigma di$$

The value of 'Tc' is the estimated consumption amount of the toner having the given color. In addition, for example, if the toner consumption amounts for the respective colors per pixel at the unit density are different from each other, the calculation may be executed using the unit consumption amount corresponding to the given color after setting the unit consumption amount of every color in the storage section 12.

The control section 11 determines the color patch set for the auxiliary calculation on the basis of the estimated consumption amount per color calculated as set forth above. The process for determining the color patch is performed as follows. In other words, different sets of color patches are stored in the storage section 12 so as to be associated with colors of the toners. More specifically, a color patch set associated with cyan (C) includes a group of single color-patches of cyan (C) having different densities from each other, one single color-patch of yellow (Y) having a certain density and one single color-patch of magenta having a certain density. Here, the term "single color" means a color, which has no other toner colors. Each color patch set includes color patches, which can be formed in a region (the region (R) shown in FIG. 3) such as blank space in a predetermined sheet of paper. Number of color patches in the color patch set is smaller than number of the color patches for the normal calibration.

After performing the auxiliary calibration or the calibration last time, the control section 11 adds up the calculated estimated consumption amounts according to the image formation command output to the printer 2, and detects a color having the largest total sum. Then, the control section 11 reads the color patch set associated with the detected color from the storage section 12 and determines it as the color patch set for the auxiliary calibration.

As shown in steps S4 and S10 of FIG. 2, when synthesizing the image formation command (called a synthesizing destination command) to be output to the printer 2 with a color patch forming command, the control section 11 synthesizes the color patch forming command included in the determined set with a part of the composition destination command. The synthesizing of commands may include synthesizing raster images, synthesizing Postscript drawing commands, or the like. In addition, a region where each color patch is to be formed is predetermined in a region where an image is hardly formed, such as the edge of a sheet.

According to this embodiment, basically, whenever reaching a predetermined number of sheets of execution intervals, the control section 11 checks, with reference to the image formation command to be output to the printer 2 next, whether or not a predetermined region where the color patch is to be formed remains when an image is formed on a sheet based on the image formation command (whether or not an image is formed in the region). If the region remains, the control section 11 forms the color patch in the region.

A user reads the color patch using a scanner for generating a profile and generates a profile of the printer 2. As a generating method of the profile is well known, a detailed explanation thereof is omitted.

In the case where the number of sheets of the set execution intervals is 10, if the image formation command corresponding to two pages is received continuously, the number of sheets reaches the tenth page when the fifth received image formation command is output to the printer 2. The control section 11 checks whether or not a predetermined region where the color patch is to be formed remains when an image is formed on a sheet based on the sixth received image formation command. If the region remains, the control section 11 synthesizes a command to form the color patch for the auxiliary calibration in the image formed based on the sixth image formation command, in order to form the color patch in the region.

In this embodiment, after the previous auxiliary calibration or the calibration is performed, the control section 11 calculates and adds up the estimated consumption amounts of the toner according to the image formation command output to the printer 2, that is, the first to fifth image formation commands, and detects the color of the toner having the largest total sum. Then, the control section 11 reads the color patch set associated with the detected color from the storage section 12 and determines it as a color patch set for the auxiliary calibration.

In the case where an image is formed on a sheet according to the sixth received image formation command, when a predetermined region where the color patch is to be formed does not remain, the control section 11 postpones the auxiliary calibration process. The control section 11 checks whether or not a predetermined region where the color patch is to be formed remains when an image is formed on a sheet according to the seventh received image formation command. The control section 11 increments the postponement counter by the number of sheets to be printed based on the image formation command until the image formation command having the predetermined region is found. When the postponement counter exceeds a predetermined count threshold value and the next image formation command does not have a predetermined region where the color patch is to be formed, the control section 11 forms the color patch on a blank sheet (that is, a blank sheet having no relation with the image formation command).

In the process of the auxiliary calibration, in the case where the color patch is formed on the blank of the image formed by the image formation command and the color patch can be formed over a plurality of pages concerned to the image formation command (the area forming the color patch remains as a blank over a plurality of pages), the number of color patches formed may increase. For example, it is desired to store the color patch set for every blank page.

In the above-described embodiment, the color patch set is selected from the predetermined sets associated with the color, which is most frequently used. However, the color patch set corresponding to an image previously formed, such as a flesh color or green, may be stored in the storage section 12, and then a user who outputs an image formation command may select the color patch set.

In the above-described embodiment, a scanner may be provided near a paper outlet of the printer 2 to read the color patch for the auxiliary calibration, to thereby generate a profile. This makes it unnecessary for the user to read the color patch, which results in an improvement in convenience.

What is claimed is:

1. An image-formation control apparatus connected to an image forming apparatus for forming an image on a medium with a plurality of color materials, the image-formation control apparatus comprising:
   a receiving unit that receives an image formation command, which is to be executed by the image forming apparatus;
   a first calibration unit that generates a first formation command to form a first number of color patches for adjusting output characteristics of the color materials in the image forming apparatus and outputs the generated first formation command to the image forming apparatus,
   wherein the first calibration unit calculates an estimated consumption amount of each color material used in the image forming apparatus on a basis of the received image formation command and determines colors of the color patches formed on a patch sheet on a basis of the estimated consumption amount; and
   a second calibration unit that outputs a second formation command to form a second number of color patches for adjusting output characteristics of the color materials in the image forming apparatus to the image forming apparatus, wherein the first number is smaller than the second number.

2. The image-formation control apparatus according to claim 1, wherein the first calibration unit synthesizes the first formation command with a part of the received image formation command to generate a patch-sheet generation command.

3. A method for controlling image formation, the method comprising:
   receiving an image formation command, which is to be executed by an image forming apparatus for forming an image on a medium;
   generating a first formation command to form a first number of color patches for adjusting output characteristics of the color materials in the image forming apparatus;
   outputting the generated first formation command to the image forming apparatus;
   outputting a second formation command to form a second number of color patches for adjusting the output characteristics of the color materials in the image forming apparatus, wherein
   the first number is smaller than the second number;
   calculating an estimated consumption amount of each color material used in the image forming apparatus on a basis of the received image formation command; and
   determining colors of the color patches formed on a patch sheet on a basis of the estimated consumption amount.

4. A program stored in a recording medium, the program causing a computer to perform a process comprising:
   receiving an image formation command, which is to be executed by an image forming apparatus for forming an image on a medium;
   generating a first formation command to form a first number of color patches for adjusting output characteristics of the color materials in the image forming apparatus;
   outputting the generated first formation command to the image forming apparatus;
   outputting a second formation command to form a second number of color patches for adjusting the output characteristics of the color materials in the image forming apparatus,
   wherein the first number is smaller than the second number;
   calculating an estimated consumption amount of each color material used in the image forming apparatus on a basis of the received image formation command; and
   determining colors of the color patches formed on a patch sheet on a basis of the estimated consumption amount.

* * * * *